US008995304B2

(12) United States Patent
Zhao et al.

(10) Patent No.: US 8,995,304 B2
(45) Date of Patent: Mar. 31, 2015

(54) ENHANCED UPSTREAM LABEL ASSIGNMENT (ULA) MECHANISM FOR POINT TO MULTI-POINT (P2MP) AND/OR MULTI-POINT TO MULTI-POINT (MP2MP) FACILITY PROTECTION

(71) Applicant: Futurewei Technologies, Inc., Plano, TX (US)

(72) Inventors: Qianglin Quintin Zhao, Boxborough, MA (US); Katherine Zhao, San Jose, CA (US); Tao Zhou, Beijing (CN); Ying Chen, Clearwater, FL (US)

(73) Assignee: Futurewei Technologies, Inc., Plano, TX (US)

( * ) Notice: Subject to any disclaimer, the term of this patent is extended or adjusted under 35 U.S.C. 154(b) by 131 days.

(21) Appl. No.: 13/711,265

(22) Filed: Dec. 11, 2012

(65) Prior Publication Data

US 2014/0160987 A1 Jun. 12, 2014

(51) Int. Cl.
*H04L 12/723* (2013.01)
*H04L 12/761* (2013.01)

(52) U.S. Cl.
CPC .............. *H04L 45/507* (2013.01); *H04L 45/16* (2013.01)
USPC ........................... 370/255; 370/256; 370/254

(58) Field of Classification Search
CPC .................................................. H04L 45/507
USPC .............. 370/389, 400, 216–235, 235.1, 254, 370/255, 256
See application file for complete search history.

(56) References Cited

U.S. PATENT DOCUMENTS

| 7,787,380 | B1 * | 8/2010 | Aggarwal et al. | 370/236 |
|---|---|---|---|---|
| 7,787,457 | B2 * | 8/2010 | Huang et al. | 370/390 |
| 8,488,614 | B1 * | 7/2013 | Aggarwal | 370/395.3 |
| 8,649,384 | B1 * | 2/2014 | Zhou et al. | 370/400 |
| 2009/0016341 | A1 * | 1/2009 | Huang et al. | 370/389 |
| 2013/0301403 | A1 * | 11/2013 | Esale et al. | 370/221 |
| 2014/0160987 | A1 | 6/2014 | Zhao et al. | |
| 2014/0161124 | A1 | 6/2014 | Zhao et al. | |

OTHER PUBLICATIONS

Li, R., et al., "Receiver-Driven Multicast Traffic-Engineered Label-Switched Paths," draft-lzj-mpls-receiver-driven-multicast-rsvp-te-02.txt, Oct. 23, 2012, 33 pages.
Zhao, K., et al., "Fast Reroute Extensions to Receiver-Driven RSVP-TE for Multicast Tunnels," draft-zlj-mpls-te-frr-00.txt, Jul. 6, 2012, 24 pages.
Bradner, S., "Key Words for Use in RFCs to Indicate Requirements Levels," RFC 2119, Mar. 1997, 3 pages.

(Continued)

*Primary Examiner* — Chuong T Ho
(74) *Attorney, Agent, or Firm* — Conley Rose, P.C.; Grant Rodolph; William H. Dietrich (57) ABSTRACT

A computer program product comprising computer executable instructions stored on a non-transitory medium of an upstream node in a network system comprising a plurality of nodes that when executed by a processor cause the node to advertise an upstream assigned label to a downstream node, receive a message from the downstream node, and if the received message confirms that no conflict with the upstream assigned label exists at the downstream node, assign the upstream-assigned label, or if the received message confirms that a conflict with the upstream-assigned label exists at the downstream node, either select a new upstream-assigned label or wait until indication is received that the label resource has become available.

12 Claims, 8 Drawing Sheets

(56) References Cited

OTHER PUBLICATIONS

Braden, R.,Ed., et al., "Resource reservation Protocol (RSVP)—Version 1 Functional Specification," RFC 2205, Sep. 1997, 112 pages.
Rosen, E., et al., "Multiprotocol Label Switching Architecture," RFC 3031, Jan. 2001, 57 pages.
Awduche, D., et al., "RSVP-TE: Extensions to RSVP for LSP Tunnels," RFC 3209, Dec. 2001, 57 pages.
Andersson, L., et al., "The Multiprotocol Label Switching (MPLS) Working Group Decision on MPLS Signaling Protocols," RFC 3468, Feb. 2003, 12 pages.
Berger, L., "Generalized Multi-Protocol Label Switching (GMPLS) Signaling Resource Reservation Protocol-Traffic Engineering (RSVP-TE) Extensions," RFC 3473, Jan. 2003, 43 pages.
Le Faucheur, et al., "Requirements for Support of Differentiated Services-Aware MPLS Traffic Engineering," RFC 3564, Jul. 2003, 23 pages.
Pan, P., Ed., et al., "fast reroute Extensions to RSVP-TE for LSP Tunnels," RFC 4090, May 2005, 38 pages.
Aggarwal, R., et al., "Extensions to Resource Reservation Protocol-Traffic Engineering (RSVP-TE) for Point-to-Multipoint TE Label Switched Paths (LSPs)," RFC 4875, May 2007, 50 pages.
Office Action dated Jun. 20, 2014, 29 pages, U.S. Appl. No. 13/750,692, filed Jan. 25, 2013.
Wijnands, IJ., Ed., et al., "Label Distribution Protocol Extensions for Point-to-Multipoint and Multipoint-to-Multipoint Label Switched Paths," RFC 6388, Nov. 2011, 39 pages.
Aggarwal, R., et al., "MPLS Upstream Label Assignment for LDP," RFC 6389, Nov. 2011, 13 pages.
Zhao, K., et al., "Fast Reroute Extensions to Receiver-Driven RSVP-TE for Multicast Tunnels," draft-zlj-mpls-mrsvp-te-frr-01.txt, Jan. 9, 2013, 25 pages.
Aggarwal, R., et al., "MPLS Upstream Label Assignment and Context-Specific Label Space," RFC 5331, Aug. 2008, 13 pages.

\* cited by examiner

ENHANCED UPSTREAM LABEL ASSIGNMENT (ULA) MECHANISM FOR POINT TO MULTI-POINT (P2MP) AND/OR MULTI-POINT TO MULTI-POINT (MP2MP) FACILITY PROTECTION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multiprotocol Label Switching (MPLS) Label Distribution Protocol (LDP) can be used to set up Point-to-Multipoint (P2MP) and Multipoint-to-Multipoint (MP2MP) Label Switched Paths (LSPs). The set of LDP extensions for setting up P2MP or MP2MP LSPs may be referred to as multipoint LDP (mLDP), which may be specified in Internet Engineering Task Force (IETF) Request for Comments (RFC) 6388, titled "Label Distribution Protocol Extensions for Point-to-Multipoint and Multipoint-to-Multipoint Label Switched Paths," which is hereby incorporated by reference. Certain Upstream Label Assignment (ULA) techniques may be specified in IETF RFC 6389, titled "MPLS Upstream Label Assignment for LDP," which is hereby incorporated by reference.

A router that experiences a node/link failure must have pre-determined alternate reroute path to protect such a failure. One approach to protect against failure of a protected node is facility protection, also known as facility backup. Facility backup methods take advantage of the MPLS label stack. Instead of creating a separate LSP for every backed-up LSP, as done in one-to-one backup methods, a single LSP is created that serves to backup one or more primary LSPs. This may also be referred to as LSP tunnel a bypass tunnel.

Current facility backup methods distinguish incoming label map (ILM) entries using label value and context keys, supported by hardware and a forwarding plane. This can be complex and costly when new nodes are added. Principles underlying label resource occupation in facility backup label assignment include the following: (a) labels assigned by the upstream-label assigner actually occupy downstream nodes' label resources, and therefore the downstream nodes may not assign the labels to other LSPs, and (b) the upstream-label assigners may assign the upstream labels to their own upstream label switching routers (LSRs), and thus upstream label space is independent of downstream label space.

SUMMARY

In one aspect, the disclosure includes a computer program product comprising computer executable instructions stored on a non-transitory medium of an upstream node in a network system comprising a plurality of nodes that when executed by a processor cause the node to advertise an upstream assigned label to a downstream node, receive a message from the downstream node, and if the received message confirms that no conflict with the upstream assigned label exists at the downstream node, assign the upstream-assigned label, or if the received message confirms that a conflict with the upstream-assigned label exists at the downstream node, either select a new upstream-assigned label or wait until indication is received that the label resource has become available.

In another aspect, the disclosure includes a network apparatus in a downstream node of a network comprising a plurality of nodes comprising a processor configured to receive a label assignment advertisement advertising a first label from an upstream assigner in a first LSP, compare the first label to an existing label for a second LSP, and if the comparison shows that the first label conflicts with the existing label, assign a second label to the first LSP, or if the comparison shows that the first label does not conflict with the existing label, assign the first label to the first LSP.

In yet another aspect, the disclosure includes, in a network node of a network system comprising a plurality of nodes, a method of distributing upstream-assigned labels, comprising assigning a downstream label for a primary LSP, receiving a message from a protected node, wherein the message carries an upstream label for the primary LSP, and deciding whether to replace the first downstream label with the second downstream label or request that the protected node reassign the upstream label for the primary LSP, wherein if the downstream label has not been used by another tunnel the downstream label is replaced with the upstream label and if the downstream label has been used by another tunnel, a request is made to the protected node to reassign a new upstream label for the primary LSP.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Facility backup protection may be used to protect primary LSPs. Label allocation in systems employing facility backup protection can be complicated and may require hardware or forwarding plane replacement when adding or eliminating nodes and/or LSPs. The disclosure includes provisions for a simple negotiation mechanism to make ULA labels unique on a MP without requiring supporting hardware or forwarding planes, in part by using a priority based protocol. When label conflicts occur, the label occupation priority may rank: (a) priority existing upstream-assigned labels as the highest priority; (b) upstream-assigned labels which are in the process of being assigned as an intermediate priority; and (c) existing downstream-assigned labels as the lowest priority. Priority protocols may be combined with make-before-break (MBB) procedures to update conflicting labels. Further information concerning MBB may be found in RFC 3509, titled "RSVP-TE: Extensions to RSVP for LSP Tunnels," which is incorporated herein by reference. The disclosure thus includes provisions for allowing the upstream label assigners to account for the label resources of the downstream nodes.

Figure 1:
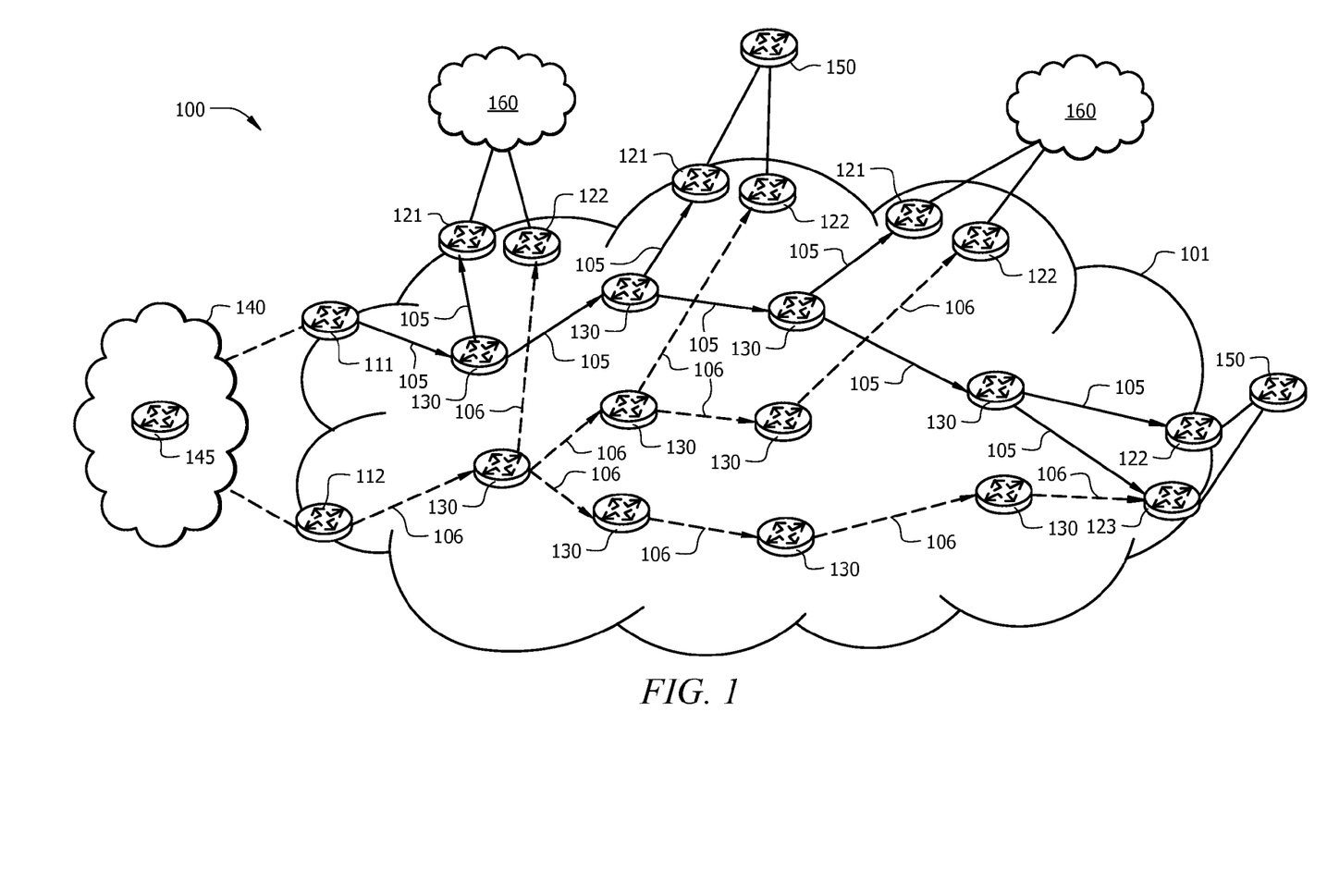
FIG. 1 is a schematic diagram of an example embodiment of one embodiment of a label switched system.

FIG. 1 is a schematic of one example embodiment of a label switched system 100, where a plurality of P2P LSPs and P2MP LSPs may be established between at least some of the components. The P2P LSPs and P2MP LSPs may be used to transport data traffic, e.g., using packets and packet labels for routing. The label switched system 100 may comprise a label switched network 101, which may be a packet switched network that transports data traffic using packets or frames along network paths or routes. The packets may route or switch along the paths, which may be established using a label switching protocol, such as MPLS or generalized MPLS (GMPLS).

The label switched network 101 may comprise a plurality of edge nodes, including a first ingress node 111, a second ingress node 112, a plurality of first egress nodes 121, and a plurality of second egress nodes 122. When a P2MP LSP in the label switched network 101 comprises at least some of the edge nodes, the first ingress node 111 and second ingress node 112 may be referred to as root nodes, and the first egress nodes 121 and second egress nodes 122 may be referred to as leaf nodes. Additionally, the label switched network 101 may comprise a plurality of internal nodes 130, which may communicate with one another and with the edge nodes. The first ingress node 111 and the second ingress node 112 may communicate with a source node 145 at a first external network 140, such as an Internet Protocol (IP) network, which may be coupled to the label switched network 101. As such, the first ingress node 111 and the second ingress node 112 may transport data, e.g., data packets, between the label switch network 101 and the external network 140. Further, some of the first egress nodes 121 and second egress nodes 122 may be grouped in pairs, where each pair may be coupled to a second external network or a client (not shown).

In an example embodiment, the edge nodes and internal nodes 130 may be any devices or components that support transportation of the packets through the label switched network 101. For example, the network nodes may include switches, routers, or various combinations of such devices. The network nodes may receive packets from other network nodes, determine which network nodes to send the packets to, and transmit the packets to the other network nodes. In some embodiments, at least some of the network nodes may be LSRs, which may be configured to modify or update the labels of the packets transported in the label switched network 101. Further, at least some of the edge nodes may be label edge routers (LERs), which may be configured to insert or remove the labels of the packets transported between the label switched network 101 and the external network 140.

The label switched network 101 may comprise a first P2MP LSP 105, which may be established to multicast data traffic from the first external network 140 to the destination nodes 150 or other networks 160. The first P2MP LSP 105 may comprise the first ingress node 111 and at least some of the first egress nodes 121. The first P2MP LSP 105 is shown using solid arrow lines in FIG. 1. To protect the first P2MP LSP 105 against link or node failures, the label switched network 101 may comprise a second P2MP LSP 106, which may comprise the second ingress node 112 and at least some of the second egress nodes 122. The second P2MP LSP 106 is shown using dashed arrow lines in FIG. 1. Each second egress node 122 may be paired with a first egress node 121 of the first P2MP LSP 105. The second P2MP LSP 106 may also comprise some of the same or completely different internal nodes 130. The second P2MP LSP 106 may provide a backup path to the first P2MP LSP 105 and may be used to forward traffic from the first external network 140 to the first P2MP LSP 105 or second P2MP LSP 106, e.g., to egress node 123, when a network component of P2MP LSP 105 fails.

Figure 2:
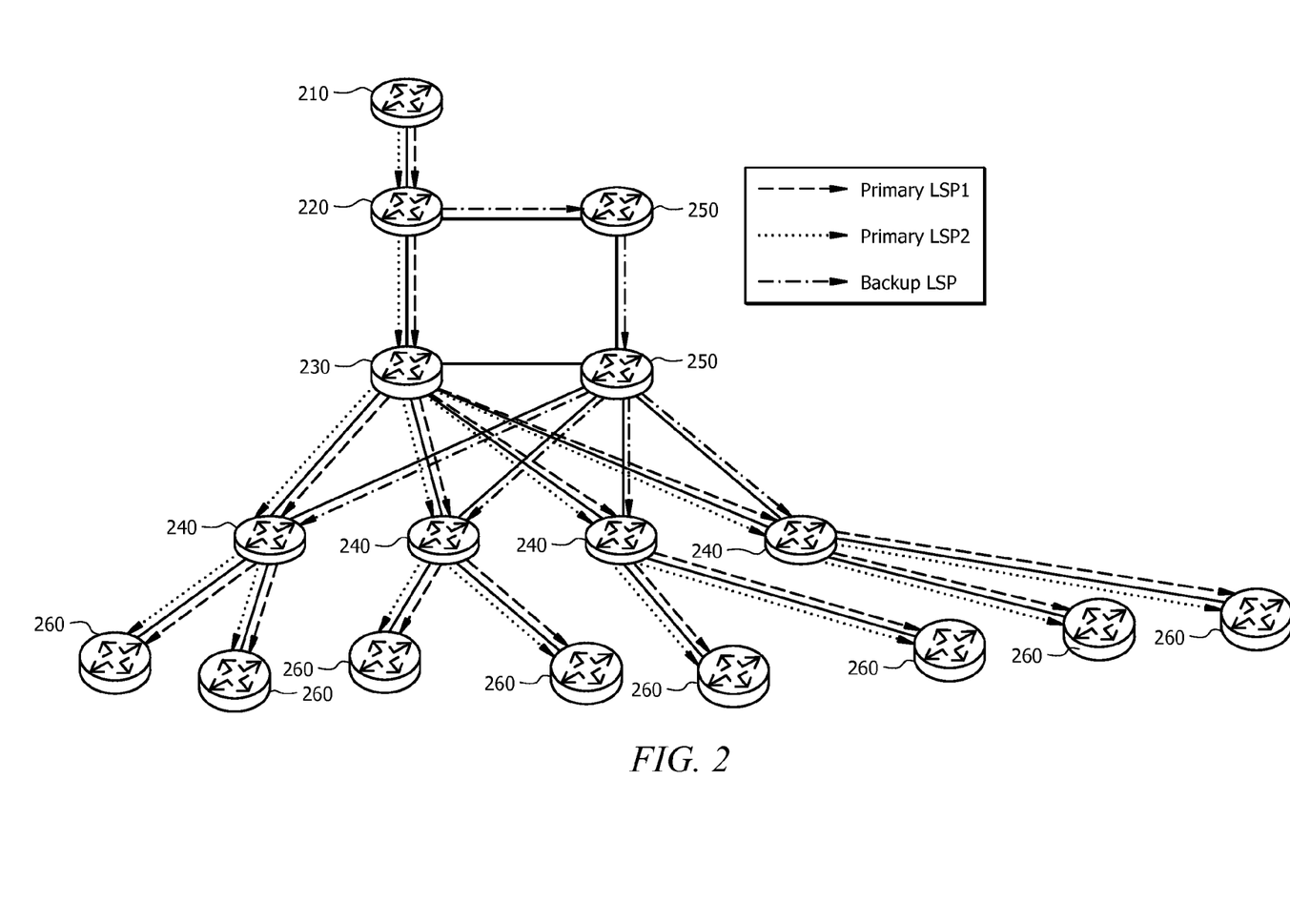
FIG. 2 is a schematic diagram of an example embodiment of a method for node protection in facility mode.
Figure 3:
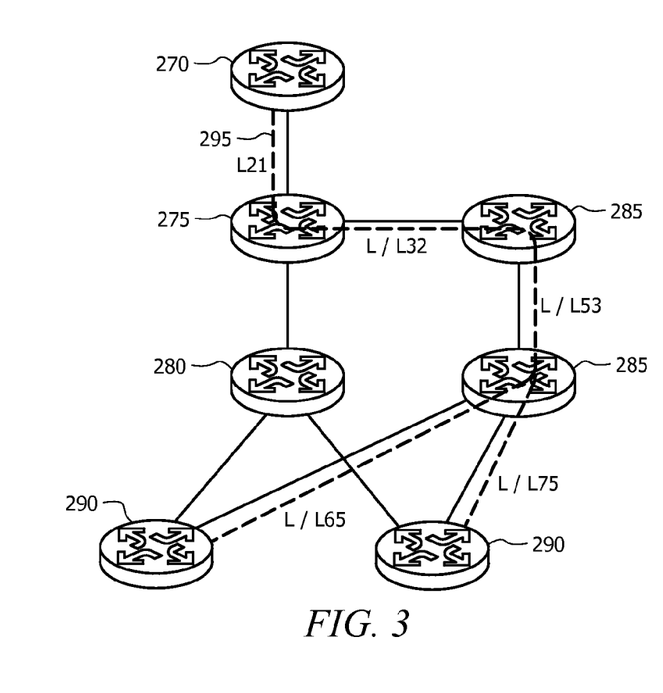
FIG. 3 is a schematic diagram of another example embodiment of a method for node protection in facility mode.

FIGS. 2 and 3 are schematic diagrams of two methods for node protection in facility mode using ULA protocols. FIG. 2 depicts facility mode protection for two primary LSPs traveling along common nodes to common destinations. A single backup LSP supports both depicted primary LSPs. The nodes of FIG. 2 may be substantially the same as the corresponding nodes of FIG. 1, wherein root 210 corresponds to ingress nodes 111 and/or 112, point of local repair (PLR) 220, protected node 230, MPs 240, internal nodes 250 correspond to internal nodes 130, leaf nodes 260 may further correspond to egress nodes 121, 122 and/or 123, the primary LSP1 and the primary LSP2 correspond to LSP 105, and the backup LSP corresponds to LSP 106. In order to achieve 1:n protection in facility mode, a unique identifier may be assigned to represent each primary LSP being protected. Without a unique LSP identifier, downstream nodes, e.g., MPs 240 or leaf nodes 260, may not distinguish between traffic received on LSP1 from traffic received on LSP2. The methods of FIGS. 2 and 3 utilize hardware support to create the unique identifiers.

FIG. 3 is a schematic diagram of a backup LSP utilized following node failure in a primary LSP (not depicted). The nodes of FIG. 3 may be substantially the same as the corresponding nodes of FIG. 1, wherein root 270 corresponds to ingress nodes 111 and/or 112, and the nodes PLR 275, protected node 280, and internal nodes 285 correspond to internal nodes 130. MPs 290 may correspond to internal nodes or may further correspond to egress nodes 121, 122 and/or 123. Beginning at PLR 275, the backup LSP 295 utilizes inner label L as the upstream-assigned label and utilizes outer labels L21, L32, L53, L75, and L65 for discrete forwarding. When a first MP 290 receives the traffic with outer label L65, the first MP 290 may utilize hardware support to determine whether label L occupies its label space or upstream label space. In FIG. 3, label L was assigned by the original multicast stream prior to failure of node N and was advertised to all LSRs in a fast re-routing (FRR) domain and used for traffic switchover in case of node N failure. FIGS. 2 and 3 both have merge points (e.g., 240, 290) where the possibility exists for label conflicts. Thus, label negotiation may be need at those merge points.

Figure 4:
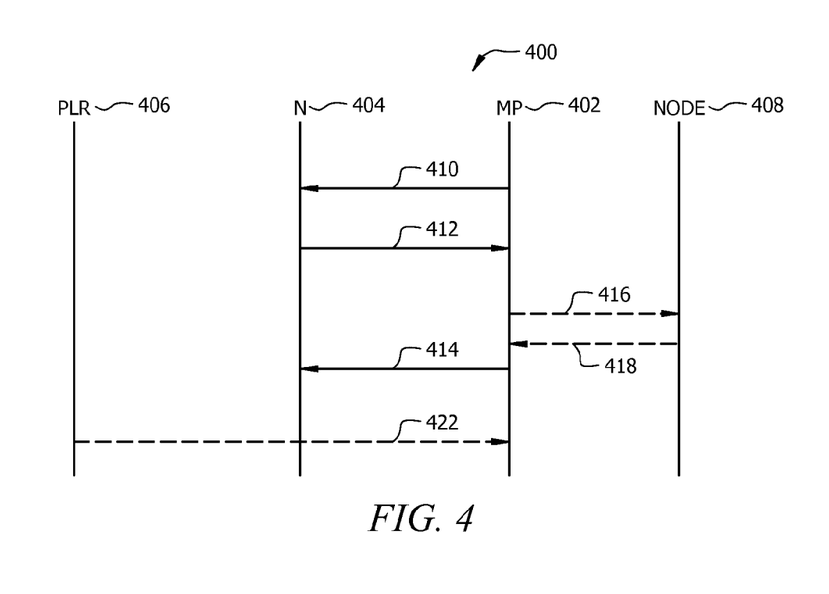
FIG. 4 is a process diagram showing an example embodiment of a label allocation and FRR entry process on a merge point (MP).

FIG. 4 is a process diagram showing an example embodiment of a label allocation and FRR entry process 400 on a MP 402. FIG. 4 also shows a protected node N 404, a PLR 406 and a separate LSP node 408. The components of FIG. 4 may be substantially the same as the corresponding components of FIGS. 2 and 3, wherein MP 402 corresponds to MPs 240, the protected node N 404 corresponds to protected node 230, the separate LSP node 408 corresponds to protected node 230 for a different LSP, and PLR 406 corresponds to PLR 220.

Process 400 may begin at 410 with MP 402 assigning a downstream label for the primary LSP and sending the assigned downstream label to the protected node N 404 using a message, for example, a PATH message, as may be defined in RFC 6510, titled "Resource Reservation Protocol (RSVP) Message Formats for Label Switched Path (LSP) Attributes Objects" and incorporated herein by reference. Upon receipt of the downstream-assigned label, N 404 may discard the downstream-assigned label and use ULA to assign a new label to be used as a label for N 404 to send traffic to MP 402. N 404 may send the upstream label to MP 402 at 412 using a message, for example, a RESV message, ibid. Once MP 402 receives the upstream label from N 404, MP 402 may evaluate the upstream label to determine whether the received upstream label conflicts with a label currently residing at MP 402.

In determining whether a conflict exists, MP 402 may use a label occupation priority protocol in which existing upstream-assigned labels have the highest priority, in-process upstream-assigned labels have an intermediate priority, and existing downstream-assigned labels have the lowest priority. An example non-conflict case may be as follows: if an identical downstream-assigned label occupies the label space requested by node N 404 at MP 402, MP 402 may replace the downstream label with the higher-priority upstream-assigned label without conflict because upstream-assigned labels in the process of being assigned have a higher priority than existing downstream-assigned labels. An example conflict case may be as follows: if an identical upstream-assigned label for a second LSP occupies the label space requested by node N 404 at MP 402, the received label conflicts and cannot be assigned until the conflict is resolved because existing upstream-assigned labels (e.g., the existing label at MP 402) have a higher priority than upstream-assigned labels which are in the process of being assigned (e.g., the label space requested by N 404).

If a conflict does not exist, MP 402 may replace its existing downstream-assigned label for the primary LSP with the received upstream label, and send the protected node N 404 a confirmation message at 414. If a conflict does exists, MP 402 may attempt to resolve the conflict, e.g., by sending a new label to internal node 408 for a separate LSP at 416. In another example embodiment, MP 402 may send a 'no label resources' and/or 'resolving conflict' message to N 404 in conjunction with resolving the conflict. Once the internal node 408 sends an indication of label reassignment to MP 402, shown at 418, MP 402 may respond to node N 404 with a confirmation message at 414. Once a message, for example the RESV message, is originated by PLR 406, sent through the backup route and received by MP 402, shown at 422, MP 402 will obtain an inner label that represents the primary LSP. MP 402 may then add an FRR entry with both inner and outer labels. The forwarding information base (FIB) for MP 402 will then have two forwarding entries for the LSP being protected in facility mode, a primary LSP entry and a backup LSP entry.

Figure 5:
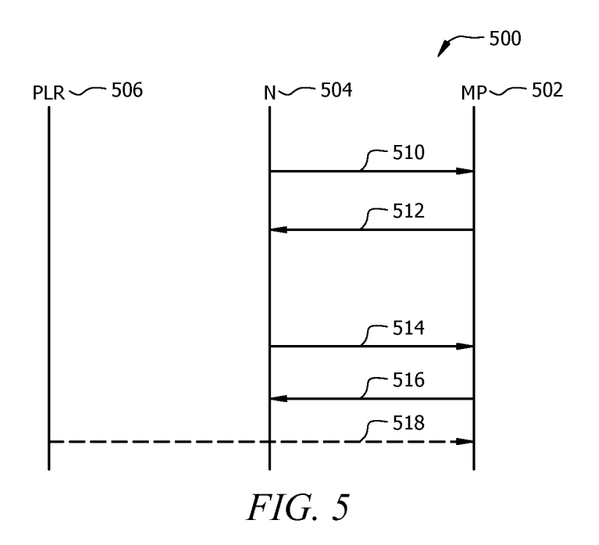
FIG. 5 is a process diagram showing another example embodiment of a label allocation and FRR entry process on a MP.

FIG. 5 is a process diagram showing another example embodiment of a label allocation and FRR entry process 500 on a MP 502. FIG. 5 also shows a protected node N 504. The components of FIG. 5 may be substantially the same as the corresponding components of FIG. 4, wherein MP 502 corresponds to MP 402, N 504 corresponds to N 404 and PLR 506 corresponds to PLR 406. Process 500 may begin at 510 with N 504 requesting the in-use labels and/or not-in-use labels from MP 502. MP 502 may respond to N 504 at 512 with a list of all the in-use labels and/or not-in-use labels at 502. In other embodiments, no request from N 504 is needed and MP 502 sends the in-use labels and/or not-in-use labels periodically or upon other trigger events. Once the list is received by N 504, N 504 may loop through the reported labels to identify a prospective new label which does not occupy MP 502 label space. In other embodiments, N 504 further loops through the lists provided by one or more additional MPs to generate a prospective new label from the offset. N 504 may subsequently send MP 502 the new ULA-conditioned label at 514 and MP 502 may send a message confirming assignment at 516. The PLR 506 message and MP 502 process 518 may substantially correspond to 422 of FIG. 4.

Figure 6:
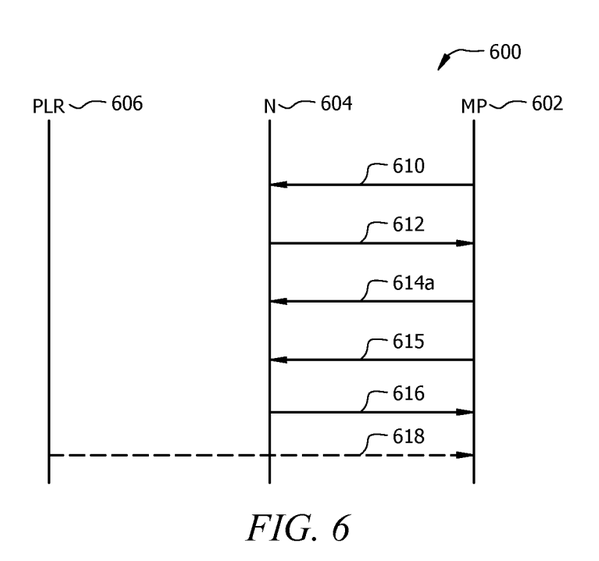
FIG. 6 is a process diagram showing still another example embodiment of a label allocation and FRR entry process on a MP.

FIG. 6 is a process diagram showing still another example embodiment of a label allocation and FRR entry process 600 on a MP 602. FIG. 6 also shows a protected node N 604. The components of FIG. 6 may be substantially the same as the corresponding components of FIG. 5, wherein MP 602 corresponds to MP 502, N 604 corresponds to N 504 and PLR 606 corresponds to PLR 506. Process 600 may begin at 610 with MP 602 assigning a downstream label for the primary LSP and sending the assigned downstream label to the protected node N 604. Upon receipt of the downstream-assigned label, N 602 may discard the downstream-assigned label and use ULA to assign a new label to be used as a label for N 604 to send traffic to MP 602. N 604 may send the upstream label to MP 602 at 612. Once MP 602 receives the upstream label from N 604, MP 602 may evaluate the upstream label to determine whether the received upstream label conflicts with a label currently residing at MP 602. In so determining, MP 602 may use a label occupation priority protocol substantially similar to 412 of FIG. 4. If a conflict does not exist, MP 602 may replace its existing downstream-assigned label for the primary LSP with the received upstream label, and send the protected node N 604 a confirmation message at 614. If a conflict does exists, MP 602 may send a 'no label resources' message to N 604 at 615. Following a 615 'no label resources' message, N 604 may select a new label for ULA. After selecting a new label, N 604 may send MP 602 a new label at 616. In one example embodiment, N 604 uses a predefined label range to increase the probability of a unique label, e.g., a hash number generated using the IP address of an LSP component, e.g., N 604, as the base of the label range. In another example embodiment, if N 604 receives a 'no label resource' notifications from the MP 602, N 604 may optionally enlarge its label resources if all free label space is used up to provide for a unique label. The steps 612, 615, and 616 may be iteratively repeated on an as-needed basis until a non-conflicting upstream label is identified and assigned at MP 602 and a confirmation message is sent at 614. The PLR 606 message and MP 602 process 618 may substantially correspond to 422 of FIG. 4.

Where the LSP contains more than one MP, the processes 400, 500, and 600 may be repeated for each additional MP with the additional MP(s) taking the role of MPs 402, 502 or 602. For every add-in primary LSP being protected by the same backup LSP, the relevant PLR will assign an inner label and send it to LSRs across the backup LSP so that each MP LSR may add corresponding FRR entries into their FIBs and use them for traffic switchover during local repair.

FIGS. 7-13 show an example embodiment of the enhanced ULA mechanism for P2MP/MP2MP facility protection. FIGS. 7-13 contain root 501, PLR 503, node 505, MP 507, MP 509, internal node 511, internal node 513, and other LSP 515. FIGS. 7-13 have an LSP 515 passing through the internal nodes 513 and 511 to the MP 509. FIGS. 7-13 may have a multipath-LSP (mLSP) running from root 501 through PLR 503 and node 505 to MPs 507 and 509. The components of FIGS. 7-13 may be substantially the same as the corresponding components in FIG. 1, wherein root 501 corresponds to ingress nodes 111 and/or 112, PLR 503, MP 507, MP 509, internal node 511, and internal node 513 correspond to internal nodes 130. MPs 507 and 509 may further correspond to egress nodes 121, 122 and/or 123. The root 501 may be a router at which the mLSP is rooted, distributing traffic to leaves along the LSP. The PLR 503 may be an LSR that detects a local failure event and redirects traffic from protected mLSP to a backup mLSP tunnel, which is supposed to locally repair the protected tunnel. The MPs 507 and 509 may be LSRs that merges the traffic from backup tunnels with primary LSP at the forwarding engine.

Figure 7:
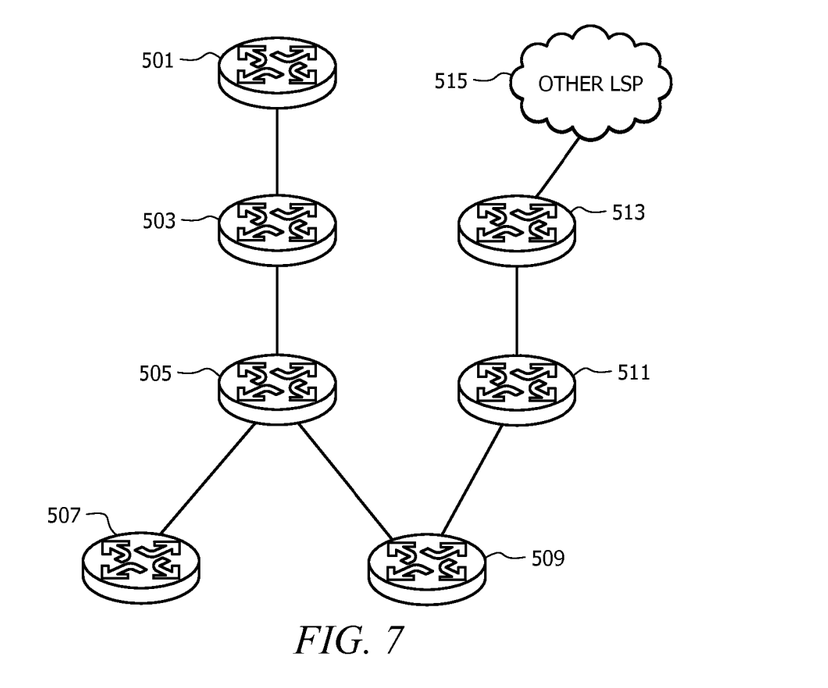
FIG. 7 is a schematic diagram of an example embodiment of the enhanced ULA mechanism for P2MP/MP2MP facility protection.
Figure 8:
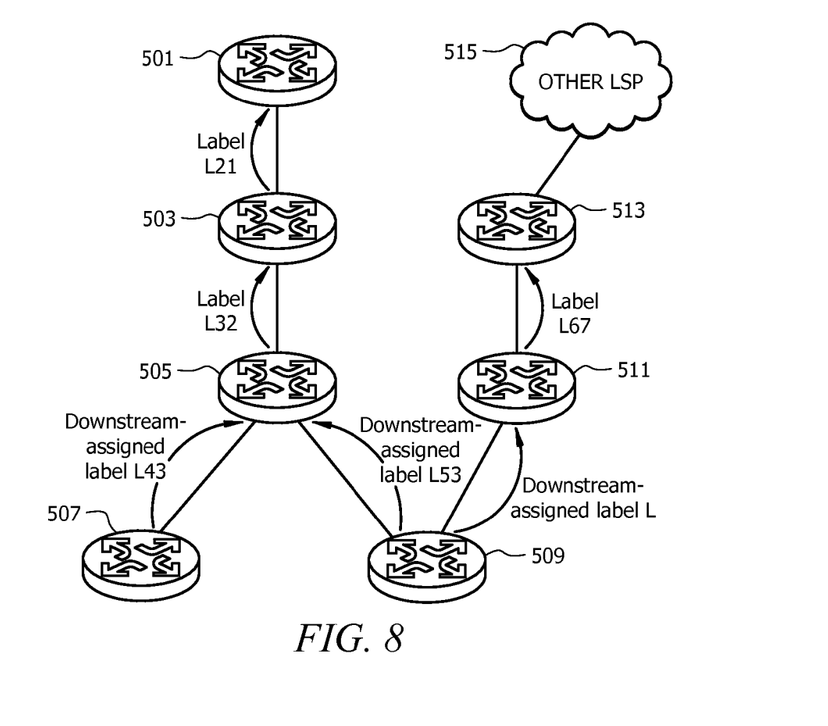
FIG. 8 is a schematic diagram of an example embodiment of the enhanced ULA mechanism for P2MP/MP2MP facility protection.

FIG. 8 shows the label assignment associated with FIG. 7. In the mLSP, the MP 509 may advertise label L53 and the MP 507 may advertise label L43 to node 505 as downstream-assigned labels. The node 505 may advertise label L32 to PLR 503, and PLR 503 may advertise label L21 to the root 501 as downstream-assigned labels. Similarly, in the path of LSP 515, the MP 509 may have assigned label L to internal node 511 as a downstream-assigned label; and internal node 511 may have assigned label L67 to internal node 513. Initially, these downstream-assigned labels may be accepted and assigned by the upstream nodes or discarded as shown in FIG. 4 at 410.

Figure 9:
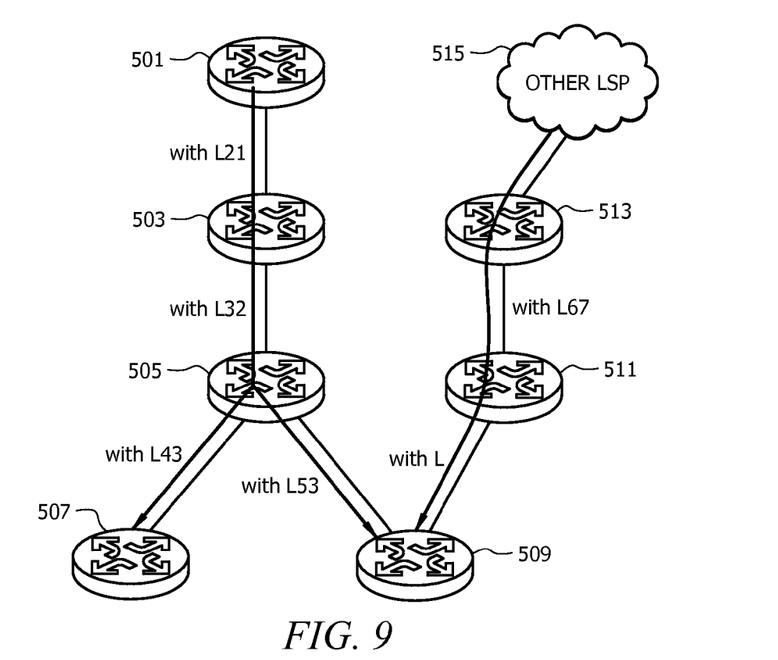
FIG. 9 is a schematic diagram of an example embodiment of the enhanced ULA mechanism for P2MP/MP2MP facility protection.

FIG. 9 shows root 501 transmitting traffic. The mLSP traffic is sent to PLR 503 with inner label L21, to node 505 with inner label L32, to MP 507 with inner label L43, and to MP 509 with inner label L53. FIG. 9 further shows the LSP originating with LSP 515 and transmitting to node 511 with inner label L67, and to MP 509 with inner label L.

Figure 10:
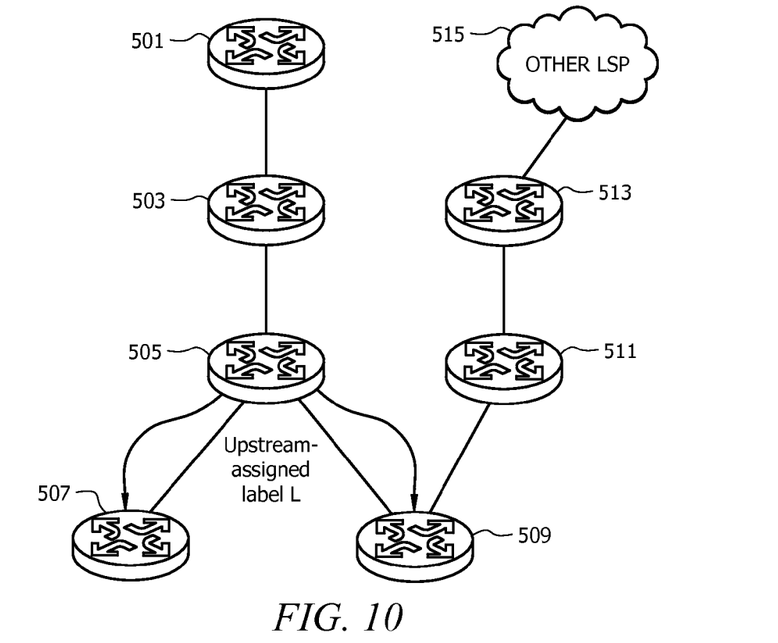
FIG. 10 is a schematic diagram of an example embodiment of the enhanced ULA mechanism for P2MP/MP2MP facility protection.

FIG. 10 shows node 505 at the beginning of the process of negotiating a new upstream-assigned label. Prior to negotiation, the downstream router, e.g., MP 507 and/or 509, may optionally advertise its downstream label space periodically or upon prompting from an upstream router, e.g., node 505, which may be substantially the same as 410 of FIG. 4. In FIG. 10, node 505 advertises the upstream-assigned label L to MPs 507 and 509, which may be substantially the same as 412 of FIG. 4. Until node 505 receives a confirmation notification from MPs 507 and 509, e.g., the confirmation sent at 414 of FIG. 4, node 505 may continue to send packets using downstream-assigned labels L43 and L53 despite advertising the new upstream-assigned label L using a MBB protocol. In an alternate embodiment, MPs 507 and 509 may send node 505 a notification of 'no label resource' in the event of a label space conflict at the MP, e.g., such as at 615 of FIG. 6.

Figure 11:
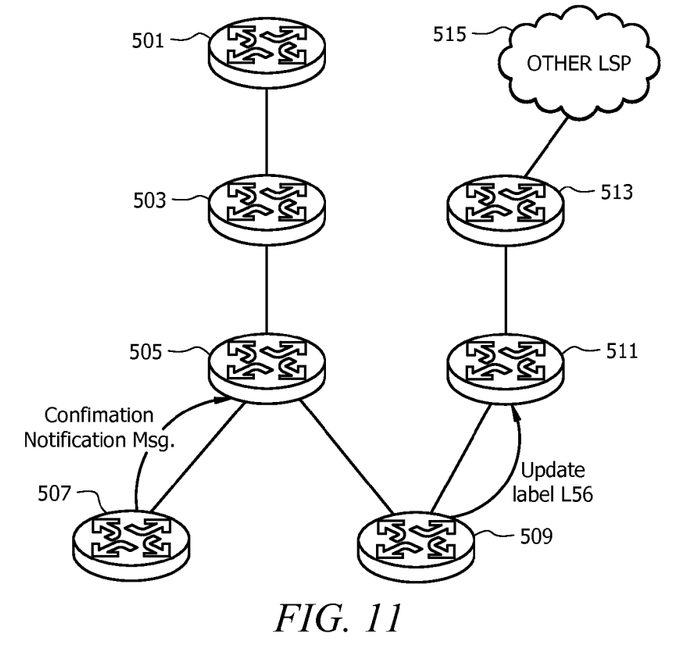
FIG. 11 is a schematic diagram of an example embodiment of the enhanced ULA mechanism for P2MP/MP2MP facility protection.

FIG. 11 shows MP 507 sending a confirmation notification message to node 505, which may correspond to 414 of FIG. 4. The confirmation message may indicate that there is no label conflict at MP 507, i.e., the new upstream-assigned label L does not conflict with any preexisting or in-assignment label at MP 507. Upon identifying a label conflict at MP 509, MP 509 may send an updated label to node 511 using an updating message, e.g., a PATH message. PATH messages are well known and are generally described in RFC 3509, "SVP-TE: Extensions to RSVP for LSP Tunnels," and RFC 3473 "Generalized Multi-Protocol Label Switching (GMPLS) Signaling Resource Reservation Protocol-Traffic Engineering (RSVP-TE) Extensions," incorporated herein by reference. FIG. 11 shows MP 509 sending an updated label, L56, to internal node 511 to replace the prior downstream-assigned label L, which may correspond to 416 of FIG. 4. MP 509 may updated label L56 according to a MBB protocol.

Figure 12:
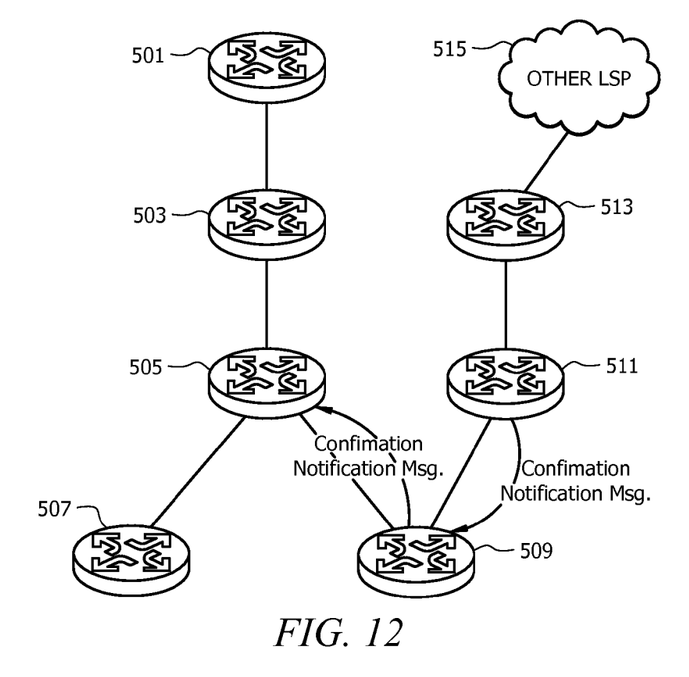
FIG. 12 is a schematic diagram of an example embodiment of the enhanced ULA mechanism for P2MP/MP2MP facility protection.

FIG. 12 shows MP 509 receiving a confirmation message from internal node 511 that the newly updated label L56 has been assigned and the prior downstream-assigned label L has been released, which may correspond to 418 of FIG. 4. When the confirmation message or a package having updated label L56 is received by MP 509 from internal node 511, MP 509 may release the prior downstream-assigned label L according to MBB protocols and send node 505 a confirmation message indicating that no label conflict exists at MP 509 for the desired upstream-assigned label, which may correspond to 414 of FIG. 4.

Figure 13:
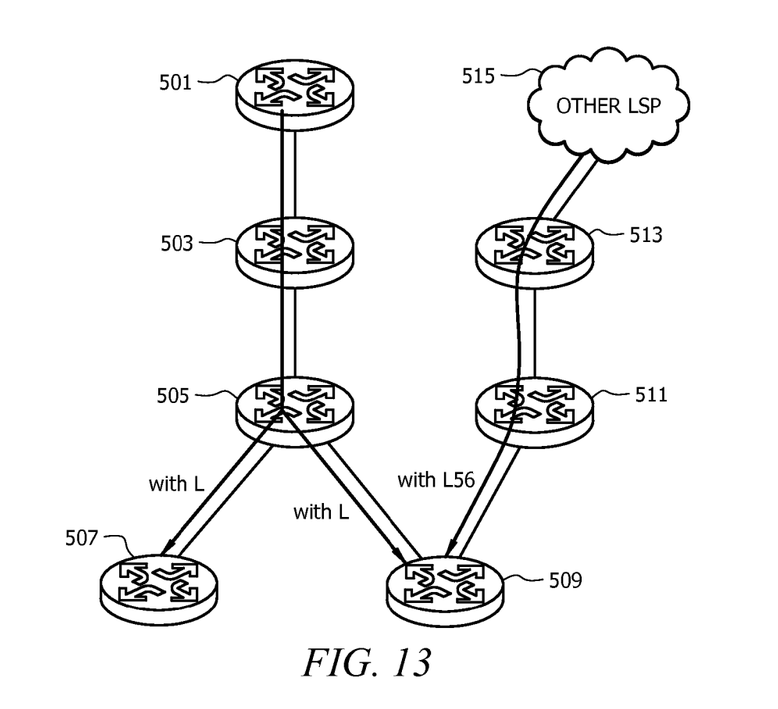
FIG. 13 is a schematic diagram of an example embodiment of the enhanced ULA mechanism for P2MP/MP2MP facility protection.

FIG. 13 shows a possible final system state following execution of the enhanced ULA mechanism for P2MP/MP2MP facility protection on the system of FIGS. 7-12. When node 505 receives confirmation from both downstream MPs 507 and 509, which may correspond to 414 of FIG. 4, node 505 may release the downstream-assigned labels and begin using L as the newly assigned upstream-assigned label according to MBB protocols. Node 505 may further inform the upstream mLSP nodes of the label assignment and the root 501 may transmit packets to MPs 507 and 509 through PLR 503 using inner label L, which may correspond to 422 of FIG. 4. Similarly, the LSP 515 may transmit packets to MP 509 using inner label L56.

Figure 14:
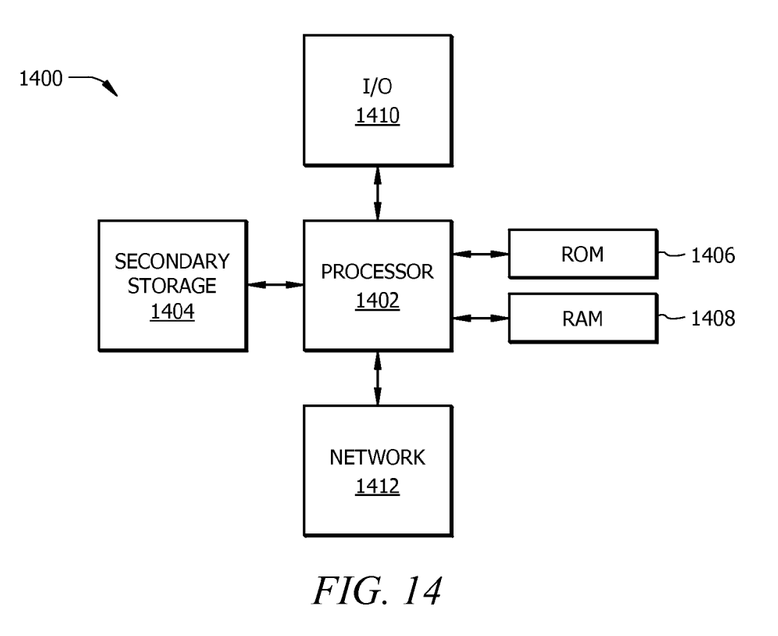
FIG. 14 is a schematic diagram of a typical general-purpose network component suitable for implementing one or more embodiments of the disclosed components.

The system and methods described above may be implemented on any general-purpose network component(s), such as those depicted in FIGS. 1-13, with sufficient processing power, memory resources, and network throughput capability to handle the necessary workload placed upon it. FIG. 14 illustrates a typical, general-purpose network component 1400 suitable for implementing one or more embodiments of the components disclosed herein. The network component 1400 includes a processor 1402 (which may be referred to as a central processor unit or CPU) that is in communication with memory devices including secondary storage 1404, read only memory (ROM) 1406, random access memory (RAM)

1408, input/output (I/O) devices 1410, and network connectivity devices 1412. The processor 1402 may be implemented as one or more CPU chips, or may be part of one or more application specific integrated circuits (ASICs) and/or digital signal processors (DSPs).

The secondary storage 1404 is typically comprised of one or more disk drives or erasable programmable ROM (EPROM) and is used for non-volatile storage of data. Secondary storage 1404 may be used to store programs that are loaded into RAM 1408 when such programs are selected for execution. The ROM 1406 is used to store instructions and perhaps data that are read during program execution. ROM 1406 is a non-volatile memory device that typically has a small memory capacity relative to the larger memory capacity of secondary storage 1404. The RAM 1408 is used to store volatile data and perhaps to store instructions. Access to both ROM 1406 and RAM 1408 is typically faster than to secondary storage 1404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

We claim:

1. In a network system comprising a plurality of nodes, a computer program product comprising computer executable instructions stored on a non-transitory medium of an upstream node that when executed by a processor cause the node to perform the following:
    advertise an upstream assigned label to a downstream node;
    receive a message from the downstream node; and
    assign the upstream assigned label when the received message confirms that no conflict with the upstream assigned label exists at the downstream node; or
    select a new upstream-assigned label or wait until indication is received that a label resource has become available when the received message confirms that a conflict with the upstream-assigned label exists at the downstream node,
    wherein the upstream-assigned label is selected from a predefined label range specific to the apparatus, and wherein the predefined label range is selected in part based on the Internet protocol (IP) address of the apparatus.

2. The computer program product of claim 1, wherein the received message is:
    a 'no label resources' message; or
    a confirmation message, wherein the confirmation message confirms that no conflict with the upstream-assigned label exists at the downstream node.

3. The computer program product of claim 1, wherein the processor is further configured to:
    prompt the downstream node to send a response message;
    receive a response message from the downstream node, wherein the response message lists one or more of the in-use or not-in-use labels at the downstream node; and
    select the upstream-assigned label using the information contained the response message.

4. In a downstream node of a network comprising a plurality of nodes, a network component comprising:
    a processor configured to:
        receive a label assignment advertisement advertising a first label from an upstream assigner in a first label switched path (LSP);
        compare the first label to an existing label for a second LSP; and
        assign a second label to the first LSP when the comparison shows that the first label conflicts with the existing label; and
        assign the first label to the first LSP when the comparison shows that the first label does not conflict with the existing label, wherein the processor is further configured to:
send a 'no resource available' message if the first label conflicts with the existing label;
receive the second label from the upstream assigner in response to the 'no resource available' message; and
prompt the upstream assigner for a new label, wherein the prompt is accompanied by a list of in-use labels or not-in-use labels.

5. The network component of claim 4, wherein the processor is further configured to utilize a make-before-break (MBB) protocol to assign the second label.

6. The network component of claim 4, wherein the processor is further configured to utilize a MBB protocol to assign the first label to the upstream assigner LSP.

7. In a downstream node of a network comprising a plurality of nodes, a network component comprising:
a processor configured to:
receive a label assignment advertisement advertising a first label from an upstream assigner in a first label switched path (LSP);
compare the first label to an existing label for a second LSP; and
assign a second label to the first LSP when the comparison shows that the first label conflicts with the existing label; and
assign the first label to the first LSP when the comparison shows that the first label does not conflict with the existing label,
wherein the first label conflicts with the existing label if the first label is of a lower priority than the existing label and labels are assigned priority as follows:
existing upstream assigned labels have the highest priority;
upstream assigned labels in the process of being assigned have an intermediate priority; and
existing downstream assigned labels have the lowest priority.

8. In a downstream node of a network comprising a plurality of nodes, a network component comprising:
a processor configured to:
receive a label assignment advertisement advertising a first label from an upstream assigner in a first label switched path (LSP);
compare the first label to an existing label for a second LSP; and
assign a second label to the first LSP when the comparison shows that the first label conflicts with the existing label; or
assign the first label to the first LSP when the comparison shows that the first label does not conflict with the existing label,
wherein the first label is selected from a predefined label range specific to the upstream assigner, and
wherein the predefined label range is selected in part based on the Internet protocol (IP) address of at least one component in first LSP.

9. In a network node of a network system comprising a plurality of nodes, a method of distributing upstream-assigned labels, comprising:
assigning a first downstream label for a primary label switched path (LSP);
receiving a message from a protected node, wherein the message carries an upstream label for the primary LSP;
deciding whether to replace the downstream label with the upstream label when the downstream label has not been used by another tunnel, or request that the protected node reassign a reassigned upstream label for the primary LSP when the downstream label has been used by another tunnel;
receiving a second upstream label and repeating the step of deciding, wherein the upstream label is the second upstream label; and
repeating the steps of assigning, receiving a message, and deciding for a backup LSP.

10. The method of claim 9, further comprising receiving an inner label representing the primary LSP.

11. The method of claim 10, further comprising adding a fast re-routing (FRR) entry with the inner label and an outer label.

12. The method of claim 10, further comprising repeating the steps of assigning, receiving a message, deciding, receiving an inner label, and adding for a second primary LSP.

* * * * *